United States Patent [19]
You

[11] Patent Number: 5,306,520
[45] Date of Patent: Apr. 26, 1994

[54] METHOD OF DISCRIMINATING AN ARTICLE

[75] Inventor: Ching C. You, Tainan, Taiwan

[73] Assignee: Yung T. Shen, Tainan, Taiwan

[21] Appl. No.: 124,049

[22] Filed: Sep. 20, 1993

[51] Int. Cl.$^5$ .............................................. B05D 5/06
[52] U.S. Cl. ...................................... 427/7; 427/163; 427/201; 427/203; 428/212; 428/325
[58] Field of Search .............. 427/161, 163, 162, 201, 427/203, 7; 428/323, 325, 212

[56] References Cited

U.S. PATENT DOCUMENTS

| | | | |
|---|---|---|---|
| 4,609,587 | 10/1986 | Giordano et al. | 428/325 |
| 4,721,649 | 1/1988 | Belisle et al. | 427/203 |
| 4,825,801 | 5/1989 | Weber | 116/201 |
| 4,896,943 | 1/1990 | Tolliver et al. | 428/325 |
| 4,950,525 | 8/1990 | Bailey | 428/325 |
| 5,069,964 | 12/1991 | Tolliver et al. | 428/325 |
| 5,093,184 | 3/1992 | Edwards | 428/195 |
| 5,169,707 | 12/1992 | Faykish et al. | 428/323 |

Primary Examiner—Shrive Beck
Assistant Examiner—Brian K. Talbot
Attorney, Agent, or Firm—Alfred Lei

[57] ABSTRACT

This invention relates to a method of discriminating an article which includes steps of finishing the article to make it have a smooth base surface, applying a transparent reflective film on the base surface of the article, the transparent reflective film being provided with a plurality of transparent spherical particles forming a first region and a plurality of transparent spherical particles forming a second region which have different distances from the base surface, distance between the transparent spherical particles in the first region and the base surface being just equal to focal length of the first transparent spherical particles in the first region, distance between the transparent spherical particles in the second region and the base surface being shorter than focal length of the transparent spherical particles in the second region, coating the transparent reflective film with a transparent protecting film, whereby the first region will be more bright than the second region when the light is vertically projected on the article, but will be less bright than the second region when light is slantwise projected on the article.

1 Claim, 6 Drawing Sheets

METHOD OF DISCRIMINATING AN ARTICLE

BACKGROUND OF THE INVENTION

As we know, the problem of counterfeiting could happen in any country. It is human nature for some individuals to seek gains through crimes. Hence, many attempts have been developed to prevent counterfeiting, but none of them are satisfactory in use.

Therefore, it is an object of the present invention to provide a method of discriminating an article which may make the article be able to be discriminating from the counterfeited one.

SUMMARY OF THE INVENTION

This invention relates to a method of discriminating an article.

It is the primary object of the present invention to provide a method of discriminating an article which may facilitate the discrimination between the real from the counterfeit.

It is another object of the present invention to provide a method of discriminating an article which is easy to be carried out.

It is still another object of the present invention to provide a method of discriminating an article which may be to applied to the trademark of the article.

It is still another object of the present invention to provide a method of discriminating an article which is practical in use.

It is a further object of the present invention to provide a method of discriminating an article which can make the article difficult to be counterfeited or imitated.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways.

Figure 1:
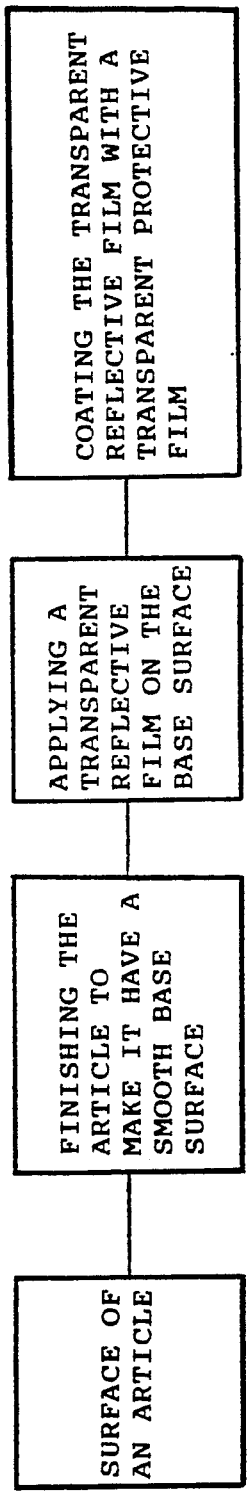
FIG. 1 is a flow chart of the present invention.
Figure 2:
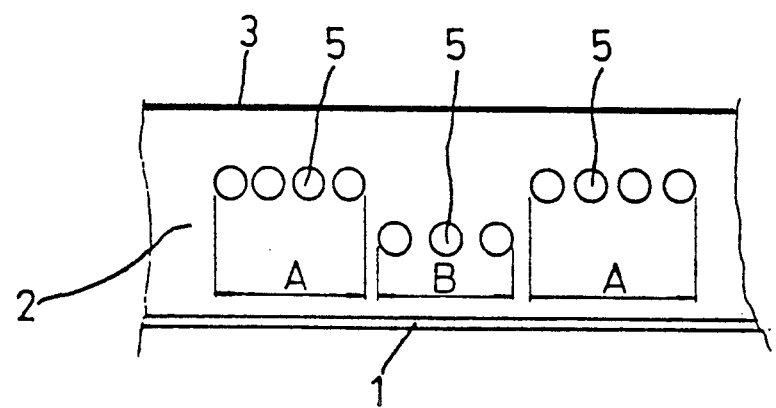
FIG. 2 is an enlarged fragmentary of the surface of an article treated by the present invention.
Figure 3:
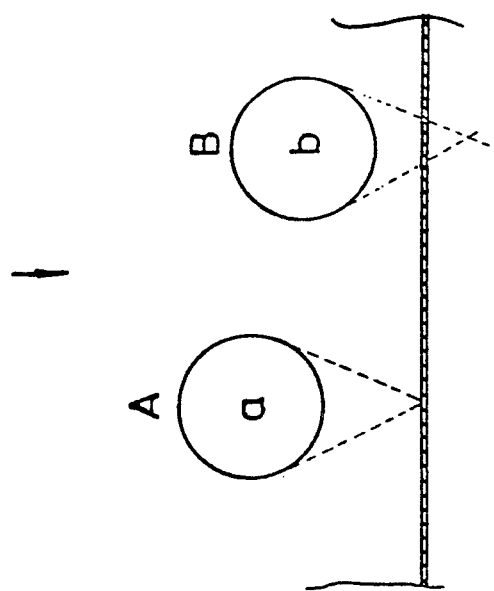
FIGS. 3 and 4 show the working principle of the present invention.

With reference to the drawings and in particular to FIGS. 1 and 2 thereof, the discriminating method according to the present invention comprises the following steps of:

1. finishing article to make it have a smooth base surface 1;
2. applying a transparent reflective film 2 on the base surface 1 of the article, the reflective film being provided with a plurality of transparent spherical particles 5 forming a first region A and a plurality of transparent spherical particles forming a second region B which have different distances from the base surface 1, the distance between the particle in region A being just equal to the focal length of the particle in region A (see FIG. 3), the distance between the particle in region B being shorter than the focal length of the particle in region B (see FIG. 3);
3. coating the reflective film 2 with a transparent protecting film 3.

Figure 4:
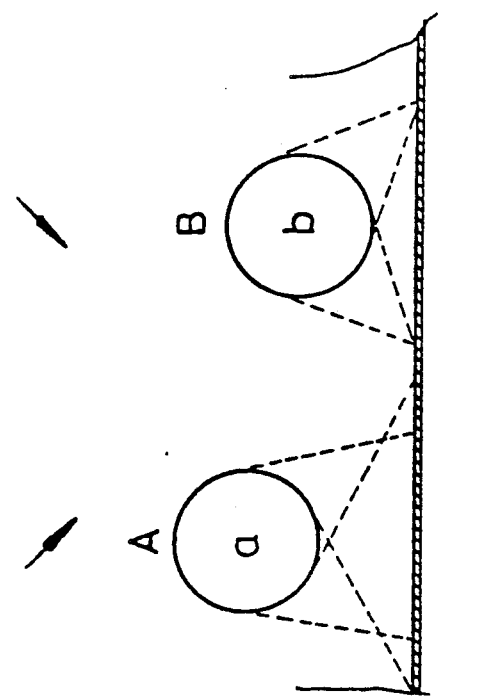
Figure 6:
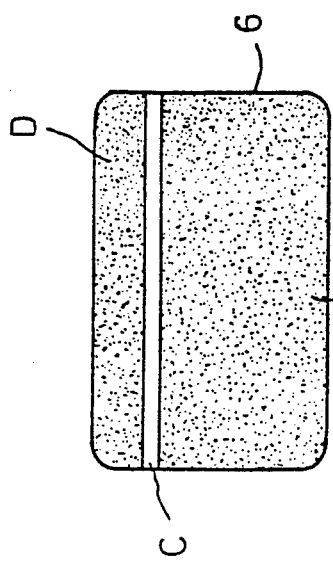
FIG. 6 is a sectional view of the license plate.
Figure 5:
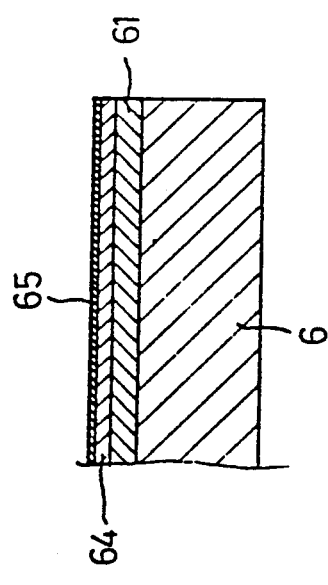
FIG. 5 shows the way to apply the present invention to a license plate.
Figure 9:
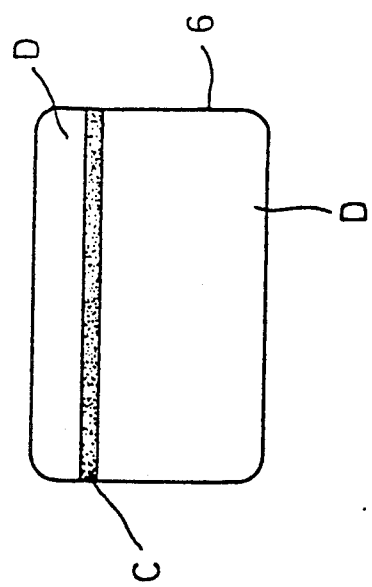
FIG. 9 shows the contrast between the region C and the region D.

The working principle of the method of discriminating an article according to the present invention is described as follows:

When light is projected vertically on the reflective film 2, the particles in region A will produce bright reflective effect, whereas the particles in region B will produce a dull reflective effect. As light is projected slantwise on the reflective film 2, the particles in region A will produce a dull reflective effect, while the particles in region B will produce a bright reflective effect (see FIG. 4). Hence, there will be a contrast in the brightness between the region A and the region B.

Figure 7:
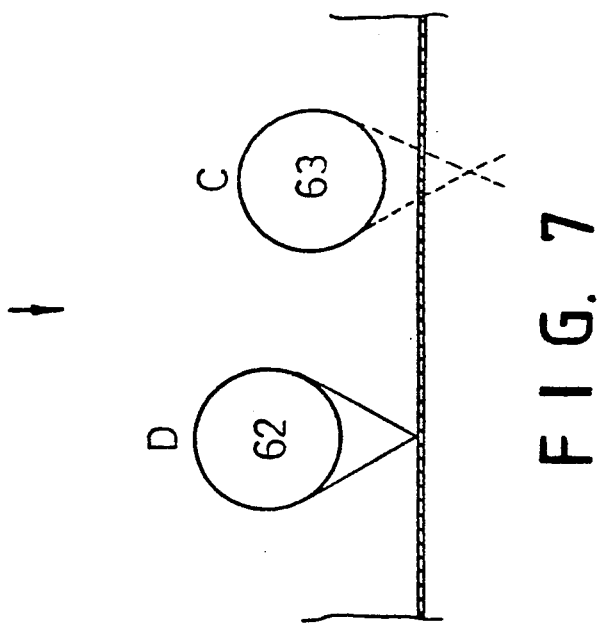
FIGS. 7 and 8 show the working principle of the license plate.
Figure 8:
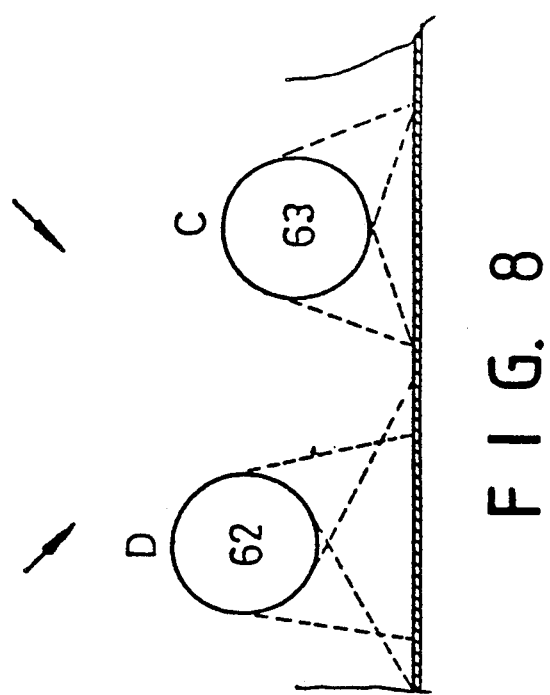

FIGS. 5, 6, 7, 8 and 9 show a preferred embodiment of the present invention. As illustrated, a license plate 6 is finished to have a smooth base surface 61 which is then coated with a transparent reflective film 64 having a plurality of particles 62 and 63. The particles 62 and 63 are of different distances from the base surface 61 and are grouped into region C and region D respectively. Then, the reflective film 64 is coated with a transparent protective film 65. As light is vertically projected on the license plate 6 as shown in FIG. 7, the region D will be more bright than the region C (see FIG. 5) thereby providing a discriminating sign. As light is slantwise projected on the license plate 6 as shown in FIG. 8, the region D will be less bright than the region D (see FIG. 9) thus providing a discriminating sign too.

Figure 11:
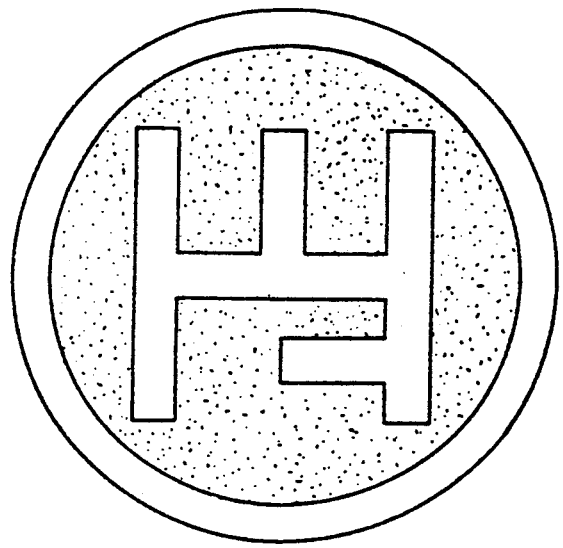
FIGS. 10 and 11 show the another application of the present invention.
Figure 10:
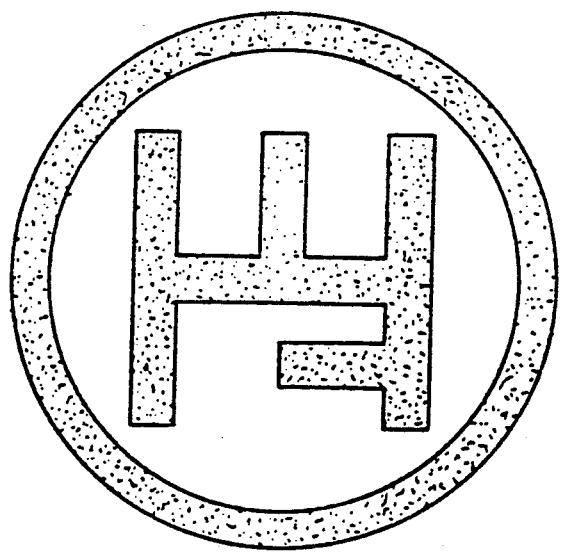

The present invention can be also applied to the trademark of a commodity (see FIGS. 10 and 11). The trademark will look like as FIG. 10 when light is vertically projected thereon, but the trademark will look like as FIG. 11 when light is slantwise projected thereon.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A method of discriminating an article comprising steps of:
   a. finishing said article to make it have a smooth base surface;
   b. applying a transparent reflective film on the base surface of said article, said transparent reflective film being provided with a plurality of transparent spherical particles forming a first region and a plurality of transparent spherical particles forming a second region which have different distances from said base surface, distance between the transparent spherical particles in said first region and said base surface being just equal to focal length of said transparent spherical particles in said first region, distance between the transparent spherical particles in said second region and said base surface being shorter than focal length of said transparent spherical particles in said second region;

c. coating said transparent reflective film with a transparent protecting film;

whereby the first region will be more bright than the second region when light is vertically projected on the article, but will be less bright than the second region when light is slantwise projected on the article.

* * * * *